(12) United States Patent
Pfeiffer et al.

(10) Patent No.: US 9,409,558 B2
(45) Date of Patent: Aug. 9, 2016

(54) HYDRAULIC BRAKE SYSTEM AND METHOD AS WELL AS CONTROL DEVICE FOR ITS OPERATION

(75) Inventors: Wolfgang Pfeiffer, Grossbottwar (DE); Willi Nagel, Remseck/Hochdorf (DE); Werner Harter, Illingen (DE); Martin-Peter Bolz, Buehl (DE); Urs Bauer, Sachsenheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 140 days.

(21) Appl. No.: 13/580,517

(22) PCT Filed: Jan. 25, 2011

(86) PCT No.: PCT/EP2011/050973
§ 371 (c)(1),
(2), (4) Date: Feb. 5, 2013

(87) PCT Pub. No.: WO2011/104056
PCT Pub. Date: Sep. 1, 2011

(65) Prior Publication Data
US 2013/0127237 A1 May 23, 2013

(30) Foreign Application Priority Data

Feb. 26, 2010 (DE) .......................... 10 2010 002 406

(51) Int. Cl.
*B60T 8/42* (2006.01)
*B60T 13/12* (2006.01)
*B60T 8/40* (2006.01)
*B60T 13/74* (2006.01)

(52) U.S. Cl.
CPC ............... *B60T 13/12* (2013.01); *B60T 8/4018* (2013.01); *B60T 8/4077* (2013.01); *B60T 13/745* (2013.01)

(58) Field of Classification Search
CPC ..... B60T 8/409; B60T 8/4086; B60T 8/4266; B60T 8/4863; B60T 8/4081; B60T 7/042; B60T 13/745
USPC .................... 303/113.4, 115.2, 140, 148, 149
See application file for complete search history.

(56) References Cited

U.S. PATENT DOCUMENTS 4,058,136 A * 11/1977 Falk .............................. 137/110
4,653,815 A * 3/1987 Agarwal et al. ............... 303/155
(Continued)

FOREIGN PATENT DOCUMENTS

CN 101070066 11/2007
DE 33 17 629 5/1983
(Continued)

*Primary Examiner* — Anna Momper
*Assistant Examiner* — Stephen Bowes
(74) *Attorney, Agent, or Firm* — Norton Rose Fulbright US LLP

(57) ABSTRACT

A hydraulic brake system has: a force-pressure conversion element, which is in hydraulic connection with at least one wheel brake cylinder of at least one wheel; a volume-adaptation element in hydraulic connection with the at least one wheel brake and the force-pressure conversion element; and as an actuating unit for actuating the force-pressure conversion element, which actuating unit has an input element. The pressure in the at least one wheel brake cylinder is adjusted by operating the volume-adaptation unit and/or the actuating unit. For this purpose an actuating state of the input element is maintained by operating the actuating unit when the volume-adaptation unit is being operated.

19 Claims, 2 Drawing Sheets

(56) References Cited

U.S. PATENT DOCUMENTS

| | | | |
|---|---|---|---|
| 5,038,565 A * | 8/1991 | Ellendt | 60/566 |
| 5,147,117 A * | 9/1992 | Quinn | 303/115.2 |
| 5,752,749 A * | 5/1998 | Lee | 303/115.2 |
| 5,758,930 A * | 6/1998 | Schiel et al. | 303/113.4 |
| 6,007,161 A * | 12/1999 | Worsdorfer | 303/115.2 |
| 6,033,035 A * | 3/2000 | Neumann et al. | 303/113.4 |
| 6,634,724 B2 * | 10/2003 | Kobayashi et al. | 303/155 |
| 6,899,403 B2 | 5/2005 | Isono et al. | |
| 7,188,913 B2 * | 3/2007 | Yokoyama et al. | 303/113.4 |
| 7,367,187 B2 * | 5/2008 | Ikeda et al. | 60/545 |
| 7,395,667 B2 * | 7/2008 | Arnold | 60/545 |
| 2003/0020327 A1 | 1/2003 | Isono et al. | |
| 2004/0251095 A1 * | 12/2004 | Simard et al. | 188/156 |
| 2008/0223670 A1 * | 9/2008 | Toyohira et al. | 188/152 |
| 2009/0115247 A1 * | 5/2009 | Leiber et al. | 303/154 |
| 2010/0114444 A1 * | 5/2010 | Verhagen et al. | 701/70 |

FOREIGN PATENT DOCUMENTS

| | | | |
|---|---|---|---|
| DE | 41 03 783 | 8/1992 | |
| DE | 10 2006 040 424 | 3/2008 | |
| DE | 10 2006 060 434 | 6/2008 | |
| DE | 10 2007 030 441 | 1/2009 | |
| DE | 10 2008 041 760 | 12/2009 | |
| EP | 0292648 | 2/1988 | |
| JP | 2002255018 A * | 9/2002 | B60T 8/48 |
| JP | 2007-131130 | 5/2007 | |
| WO | WO/2004 005095 | 1/2004 | |

\* cited by examiner

HYDRAULIC BRAKE SYSTEM AND METHOD AS WELL AS CONTROL DEVICE FOR ITS OPERATION

BACKGROUND OF THE INVENTION

1. Field of the Invention

The present invention relates to a hydraulic brake system, in which a pressure in at least one wheel brake cylinder of the hydraulic brake system is adjusted by means of a volume adaptation device and an actuating device. A pressure adjustment may be undertaken individually for each wheel, in particular, and within the framework of an anti-lock brake control, a phase of active pressure buildup and/or a regenerative braking operation.

2. Description of the Related Art

Published European patent application document EP 0292648 A2 discloses a brake system having an anti-lock braking control, which essentially is made up of a hydraulic brake pressure generator actuated by a pedal, a brake-pressure modulator installed in the pressure-means paths between the brake pressure generator and the wheel brakes, with whose aid the brake pressure is variable via a volume change of a chamber containing the hydraulic medium. In such systems the path of the pressure medium from the brake pressure generator to the affected wheel brake is blocked as soon as the rotation behavior of the wheel indicates a locking tendency, and the volume of a chamber which contains an enclosed hydraulic medium and which is connected to the wheel brake is expanded with the aid of a supplementary force. In this described brake system the driver is cut off from the hydraulic braking system in an antilock control. This may cause him to perceive a hard brake pedal, which may be irritating to a driver.

The published German patent application document DE 3317629 A1 relates to a method for controlling a brake system of a vehicle, especially road vehicles, providing brake-slip control, in which the pedal force, together with a supplementary force, is transmitted to a master brake cylinder and from there to the individual wheel brake cylinders via a plurality of pressure means paths which are able to be blocked independently of each other. In addition, the wheel rotation behavior and the vehicle speed or a variable corresponding to the vehicle speed are furthermore measured, the signals are logically linked and processed and then analyzed in order to generate control signals. In the control case, i.e., when a locking tendency arises at a wheel, these control signals are used for lowering the brake pressure at the wheels, for keeping it constant or for increasing it individually or as a group, as a function of the wheel rotation behavior.

Brake systems as described in the mentioned printed publications may produce different pedal feels in the described pressure regulation, which may be perceived as annoying by the driver.

BRIEF SUMMARY OF THE INVENTION

The hydraulic brake system according to the present invention has a force-pressure conversion element, which is hydraulically connected to at least one wheel brake cylinder of at least one wheel. Furthermore, the hydraulic brake system includes a volume adaptation element in hydraulic connection with the at least one wheel brake and the force-pressure conversion element, and it includes an actuating unit for actuating the force-pressure conversion element. In addition, the actuating unit has an input element. The pressure in the at least one wheel brake cylinder, i.e., the brake pressure, is adjusted by operating the volume-adaptation unit and/or the actuating unit.

When the actuating unit according to the present invention is in operation, it is provided that an actuating state of the input element is maintained while the volume adaptation unit is operated. The force-pressure conversion element may be, for instance, a brake master cylinder of a hydraulic brake system, and the actuating unit may be a brake force booster, for example, which has an input element such as an input rod. The brake master cylinder is actuated by the driver and/or the brake force booster. Said volume adaptation unit may be a plunger driven by a motor. If the pressure in the hydraulic brake system or in parts thereof, in particular at a wheel brake cylinder, is adjusted by means of the plunger, this is accomplished by operating the brake force booster and the volume adaptation unit.

A pressure change is advantageously able to be implemented by a volume adaptation unit in the hydraulic brake system; for this purpose the actuating state of the input rod and thus, of a brake pedal connected to the input rod or coupled thereto, is maintained during the pressure change. In this way the driver perceives no irritating feedback via the pedal in such a pressure change. A change in the wheel pressure at at least one wheel, i.e., in wheel-specific manner, is advantageous as well. The pressure change may therefore take place at the at least one wheel brake cylinder at which a pressure change is required due to the current driving situation.

In an advantageous refinement of the brake system according to the present invention, the pressure in the at least one wheel brake cylinder is set by operating the volume adaptation unit and/or the actuating unit once the hydraulic connection between the at least one wheel brake cylinder and the volume adaptation unit, i.e., the plunger, and the brake master cylinder has been established. The hydraulic connection between the other wheel brake cylinders, i.e., the wheel brake cylinders for which no pressure adjustment is intended, the plunger and the brake master cylinder is interrupted during the process. This advantageously makes the brake pressure at at least one wheel brake cylinder adjustable. Since the brake master cylinder is connected to the wheel brake cylinder in such a case, isolating valves, which decouple the brake master cylinder from the rest of the brake system, may advantageously be dispensed with in this pressure adjustment. Dispensing with additional isolating valves goes hand in hand with cost and space savings.

In another advantageous refinement of the hydraulic brake system, the actuating unit has a brake force booster. Maintaining the actuating state of the input element means maintaining the force to be applied, i.e., the force that must be applied in order to retain the input element at a certain position. The brake force booster is advantageously controlled in such a way that the force to be applied by the driver for the purpose of retaining the input element at a certain position is not tied to the pressure prevailing in the brake system. The force to be applied, in particular, is independent of the pressure set by means of the volume adaptation unit. In the present invention, the brake force booster is to be operated in such a way that an actuating position of the brake force booster is retained.

When actuating a brake pedal, and thus when positioning the input element, a driver must apply a certain force. The force to be applied at a position of the input element conveys a particular pedal feel to the driver. If it is ensured by operating the brake force booster that the applicable force assigned to this position of the input element is independent of a pressure setting by the plunger, i.e., that it is not modified thereby, then this has the advantage that the pedal feel for the driver remains unchanged. In other words, the driver does not receive any irritating feedback.

Interrupting means are advantageously provided for establishing or interrupting the hydraulic connection between the wheel brake cylinder(s) and the brake master cylinder as well as the plunger. The interrupting means may be provided in the form of hydraulic valves. The hydraulic valves are either switching valves or control valves. Providing the hydraulic brake system with switching and/or control valves has the advantage that the position of the valves, and thus the pressure distribution in the hydraulic brake system, is able to be controlled by means of a control device. In addition, a volume transport of brake medium is able to be conducted and influenced in its dynamics by means of the valves. When using control valves, for instance, the flow rate through a corresponding hydraulic line is variable. In the brake system according to the present invention, the valves of the first type are valves which are closed in the deenergized state, and the valves of the second type are open valves in the deenergized state. The valves of the first type are used for coupling/decoupling the plunger to/from the rest of the hydraulic brake system and/or for controlling the flow of brake medium out of or into the plunger. The valves of the second type are assigned to the individual wheel brakes. As a result, a pressure adjustment is advantageously assignable to an individual wheel with the aid of the valves of the second type, or a pressure adjustment is able to be performed at such a wheel. Equipping the brake system with valves of the first type, which are closed when no current is flowing, and valves of the second type, which are closed in the deenergized state, allows braking solely by the driver in the event of a current breakdown or a defect in the brake system when the connection from the brake master cylinder to the wheel brakes is open; in this case, the driver introduces braking into the wheel brake cylinders directly, possibly using only muscle power.

In one advantageous refinement of the brake system according to the present invention, the hydraulic connection of the at least one wheel brake cylinder to the brake master cylinder is implemented via precisely one valve of the second type, i.e., a control and/or switching valve which is open when no current is flowing. No further valve is situated in the hydraulic path between the wheel brake cylinder.

In this way the hydraulic brake system may have one valve in each case, which is to be assigned to an individual wheel. The described option of setting the pressure individually for each wheel using such a low number of valves—one per wheel and at least one for the plunger—and the fact that additional isolating valves are not required yields enormous space and cost savings. In addition, less energy is consumed since only a small number of valves has to be actuated.

In one further advantageous refinement of the hydraulic brake system, it may be provided that the pressure adjustment in at least one wheel brake cylinder is implemented by operating the plunger, by way of at least one direct hydraulic connection between the volume adaptation unit and the at least one wheel brake cylinder, and/or via at least one indirect hydraulic connection by way of the force-pressure conversion element, which in this instance is the brake master cylinder. When configuring the coupling of the plunger to the rest of the hydraulic brake system using only one line and only one valve, it is possible, if appropriate, that only a portion of the wheel brakes connected to the brake system is directly connected to the plunger via the valves provided in the line. In addition, there may be wheel brakes which are not directly coupled to the plunger, for instance because they are assigned to a brake circuit to which the plunger is not connected. Nevertheless, a pressure adjustment is possible at the wheels which are not directly connected, provided the pressure adjustment takes place via the brake master cylinder according to the present invention. In the brake system according to the present invention, it is therefore possible to dispense with an additional valve, which once again is more advantageous in terms of cost.

Furthermore, the present invention relates to a method for operating a hydraulic brake system. The hydraulic brake system includes a force-pressure conversion element, which is hydraulically connected to at least one wheel brake cylinder of at least one wheel; a volume adaptation element, which is hydraulically connected to the at least one wheel brake cylinder and the force-pressure conversion element; and it includes an actuating unit for actuating the force-pressure conversion element. The actuating unit furthermore is provided with an input element. As already indicated earlier, the mentioned components may in the form of a brake master cylinder, a plunger, and a brake force booster having an input element assigned to the brake force booster, so as to detect a brake actuation by the driver. In a first operating mode in the method according to the present invention, the pressure in the at least one wheel brake cylinder is adjusted by operating the volume adaptation unit and the actuating unit. In this case a first operating mode is an operating mode which, for instance, corresponds to a pressure modulation at at least one wheel brake cylinder (ABS), or it may also correspond to an active pressure buildup (ESP). In the same way, the hydraulic brake system may be operated in a regenerative brake system in this first operating mode. In the first operating mode, the pressure in the at least one wheel brake cylinder is adjusted by operating the volume adaptation unit and the actuating unit. In this case it may be the case that the brake force booster, the driver, and/or both have/has generated the pressure in the brake system jointly. A pressure adjustment at the individual wheel brake cylinder then is carried out by the volume adaptation unit, i.e., the plunger. In this way a pressure adjustment takes place with the aid of the volume adaptation unit and the actuating unit. In case of an active pressure buildup, the pressure may be built up using the plunger and/or the brake force booster. It is also possible that the brake force booster is used merely for closing the compensation bores of the brake master cylinder, thereby allowing a pressure buildup solely by the plunger. Even in an active pressure buildup, thus by volume adaptation unit and actuating unit. In this context an actuating state of the input element is maintained by operating the actuating unit when the volume adaptation unit is in operation. Maintaining the actuating state of the input element and the attendant advantages have already been discussed.

In the method according to the present invention, it may advantageously be provided that the pressure in the at least one wheel brake cylinder is adjusted in temporal sequence with at least one of the other wheel brake cylinders. This procedure describes a method for operating the brake system using the multiplex method. In this case temporal sequence means consecutively or also one after the other. The sequence of the pressure adjustment at the individual wheels is variable and may advantageously be adapted to the driving situation at hand. In a braking operation, for instance, it is possible to adjust the pressure always at the currently locking wheel.

In a second operating mode of the hydraulic brake system, the pressure is adjusted solely by actuating the actuating unit. This describes the operating mode of a normal braking operation, in which the brake master cylinder is actuated by the driver and/or the brake force booster, and in which braking takes place at all wheels.

In an advantageous refinement, the method according to the present invention carries out an active pressure buildup, in particular an active pressure buildup which is independent of the driver, e.g., in an ESP functionality of the hydraulic brake system. Independent of the driver denotes an independence of the driver as far as a brake actuation is concerned. The method according to the present invention may also be used for setting the pressure in a pressure modulation at at least one wheel brake cylinder. Moreover, the pressure adjustment is able to take place during a regenerative braking operation. In this case, the pressure adjustment may be used to adapt a hydraulic braking effect to the braking effect of the regenerative brake torque. This keeps an overall braking effect constant, in particular.

The advantage of the pressure adjustment in said operating situations in the method of the present invention is a representation of the operating situations by way of the brake system according to the present invention, which, as described, manages to operate with a small number of valves and prevents interfering/annoying feedback to the driver from the hydraulic brake system via the input element. As a result, a hydraulic brake, which is able to represent different functionalities, such as an ABS or an ESP functionality, for instance, is able to be operated. In addition, the method according to the present invention may also be used to realize functionalities such as automatic column driving, brake-disk wipers, precharging of the wheel brakes and/or a hydraulic reservoir, through an active pressure buildup.

The mentioned advantages of the hydraulic brake system according to the present invention and of the method according to the present invention are transferable to the control device which implements the method of the present invention and which controls the hydraulic brake system.

DETAILED DESCRIPTION OF THE INVENTION

The present invention relates to a brake system of a vehicle. The brake system includes a hydraulic brake system, in particular.

In addition to the hydraulic brake system, the brake system may include additional brake systems, especially a regenerative brake system.

Figure 1:
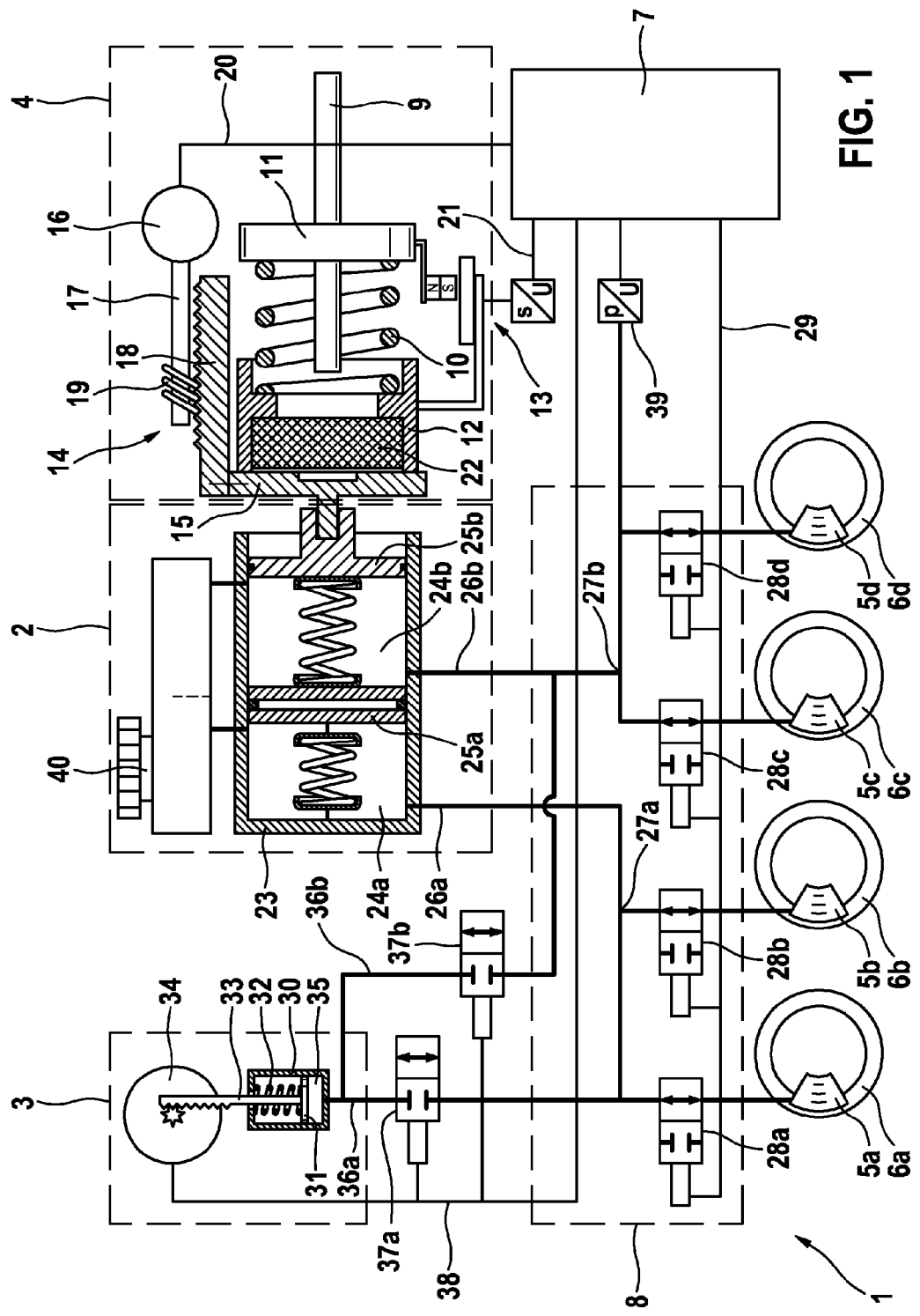
FIG. 1 shows the hydraulic brake system according to the present invention, which essentially includes an actuating unit 4, a force-pressure conversion element 2, a hydraulic unit 8, wheel brakes 5a-5d connected to the hydraulic unit, a control unit 7, and a volume adaptation unit 3.
Figure 2:
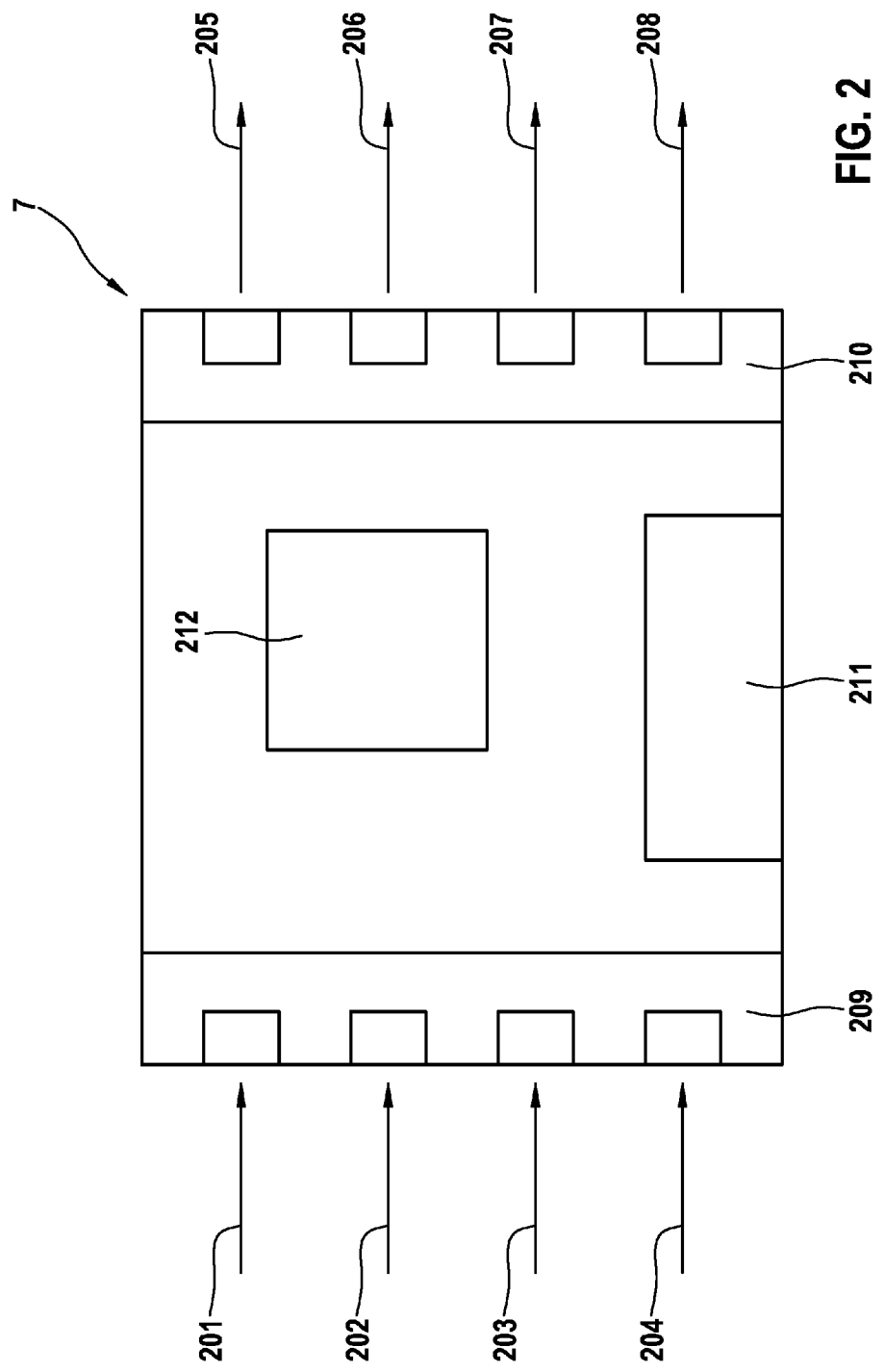
FIG. 2 shows a control unit, with whose aid the hydraulic brake system is controlled and by which the method according to the present invention is implemented.

Hydraulic brake system 1 of the specific development shown in FIG. 1 essentially includes an actuating unit 4, a force-pressure conversion element 2, a hydraulic unit 8, and wheel brakes 5a-5d connected to the hydraulic unit. In addition, hydraulic brake system 1 has a control unit 7. Control unit 7 may be provided as single control unit, but it is also conceivable that control unit 7 is installed as a subunit of a control unit of the overall brake system or of the vehicle. A control within the framework of this application may also denote a regulation.

Furthermore, hydraulic brake system 1 includes a volume adaptation unit 3, which is hydraulically linked to hydraulic unit 8 and to force-pressure conversion element 2.

Hereinafter, the individual components of the hydraulic brake system will be elucidated in greater detail.

Actuating unit 4 includes an input element 9, which is shown here as an input rod 9. Input rod 9 absorbs a force applied by the driver. The driver applies this force in order to actuate the brake system, especially the hydraulic brake system, and to initiate a deceleration of the vehicle. This is also known as the actuating force of the driver. In the exemplary embodiment illustrated, the driver applies the actuating force to an elastic element, which is a spring, especially a pressure spring 10. Spring 10 is braced on a shoulder 11 of input rod 9, and on a support part 12 via the second side. Shoulder 11 may be integrally formed with input rod 9 or also premolded thereon, bonded, welded or affixed to it in some other manner. The driver specifies a braking intent via input rod 9, by applying the actuating force to input rod 9. A sensor device 13 is provided to determine the braking intent, the sensor device determining a displacement of input rod 9 relative to support part 12. The sensor device is a travel sensor, in particular, or also a differential travel sensor. Sensor unit 13 is connected to control unit 7 via a line 21, especially a data line. Control unit 7 uses the signals from sensor unit 13 to control the brake system. Actuating unit 4 has a brake force booster 14 for actuating force-pressure conversion element 2, which is illustrated as an electromechanical brake force booster in this specific development. Brake force booster 14 is a regulatable/controllable brake force booster, which is able to be operated by the driver and/or independently of the driver. The supplementary force of brake force booster 14 in particular is adjustable as a function of the actuating force applied by the driver and/or independently thereof. However, the present invention is not restricted to this specific development of a controllable/regulatable brake force booster; a pneumatic or a hydraulically controllable brake force booster is conceivable as well. Electromechanical brake force booster 14 shown in FIG. 1 includes an output element 15, which transmits the force actuating unit 4 applies to actuate brake system 1, to the force-pressure conversion element. This output element 15 is either integrally formed with, or connected to, a booster body 18 of brake force booster 14. Booster body 18 has a transmission 19, which uses a transmission rod 17 to convert a rotation of a motor 16 of brake force booster 14 into a translation of booster body 18. Other types of transmission are conceivable, such as a ball screw drive or also a worm drive. Brake force booster 14, in particular the booster body, is able to be moved back and forth via the direction of rotation of motor 16. The motor is also controlled by control unit 7. The control unit is able to implement both an open-loop control and a closed-loop control of motor 16. For this purpose motor 16 is connected to control unit 7 via a line, especially a data line 20.

BFS Functionality (Brake Force Sensor):

As already mentioned, support part 12 has a support surface for spring 10. Furthermore, the support part at least partially includes a damping element 22, which is situated between support part 12, especially between the side of the seating of the support part facing away from input rod 9, and the output element.

When decelerating, the driver operates input rod 9 by applying an actuating force, so that he displaces the input rod in relation to support part 12 and thereby compresses elastic element 10.

Using spring 10 and sensor device 13, and possibly the damping element in addition, the driver's braking intent is able to be detected in the following manner. Using sensor device 13, a displacement of input rod 9 relative to support part 12 is determined. Spring 10 and damping element 22 have an individual characteristic via which a deformation of spring 10, or of damping element 22, is set in relation to a resulting restoring force, or also a counter force, which is acting on input element 9. Spring 10 may have a linear characteristic, in particular. In a first operating range, input element 9 is not in contact with damping element 22. In this operating range the force introduced by the driver is able to be determined very precisely based on the spring characteristic of spring 10 and with the aid of sensor device 13. When input element 9 is resting against damping element 22 in a second operating range, which will be discussed further down in the text, then a combined characteristic consisting of the effect of damping element 22 and spring 10, must be taken into account.

When a strong input force and/or a large displacement exists between input rod 9 and support part 12 in a brake operation, it is possible that contact is made between input element 9, more precisely, shoulder 11, and support part 12. In such a situation the actuating force of the driver at least partially also comes to act directly on output element 15. In the same proportional manner, a portion of the actuating force of the driver enters into the deformation of spring 10 and into the deformation of damping element 22. When damping element 22 is deformed, a protrusion of damping element 22 may project into the sketched receptacle on output element 15, or it may even fill it up. In this way, an at least proportional force transfer from input element 9 to output element 15 may take place via spring 10 and damping element 22.

Based on the specified braking intent of the driver, especially based on at least one signal from sensor unit 13, control unit 7 controls the motor of the brake force booster in such a way that the operation of motor 16 causes booster body 18 to assume a new position. Support part 12, which is slidingly supported relative to booster body 18, follows the shift in position of booster body 18. The position to be assumed by booster body 18 is adjustable with the aid of sensor unit 13. The pedal force the driver must apply for such a braking operation, i.e., the force to be applied when braking in order to keep the pedal in this position, depends on spring 10, especially on the deformation of spring 10 by the input rod. A constant relative deflection of input rod 9 and support part 12 corresponds to a fixed pedal force.

In the event that the brake force booster malfunctions or that the supplementary force of the brake force booster is no longer sufficient for braking, the driver is able to override spring 10, which then causes input rod 9 to come into contact with damping element 22. As described above, the driver is able to apply actuating force to output element 15 himself, either via support part 12 or via spring 10 and damping element 22, and in this way can still carry out a braking operation even if the brake force booster is unavailable, or he may increase the brake pressure in the event that the supplementary force of the brake force booster is no longer sufficient for braking; however, both options require greater force.

The force-pressure conversion element, as shown in FIG. 1, corresponds to a brake master cylinder and is illustrated as tandem brake master cylinder in this case. Housing 23 has two chambers 24a and 24b in the known manner, both of which are in hydraulic connection with a brake fluid reservoir. The chambers are formed by a first piston 25b, a second piston 25a, and housing 23. First piston 25b absorbs the actuating force applied by the actuating unit. In addition, each chamber has a prestressed spring, which is employed for resetting brake master cylinder 2. Each chamber 24a and 24b has an output, to which a separate hydraulic line 26a and 26b is connected.

In the known manner, each of these lines leads to a connected brake circuit. Each brake circuit may be assigned at least one wheel brake having at least one wheel brake cylinder 5a, 5b, 5c, 5d at at least one wheel 6a, 6b, 6c, 6d. The assignment of the wheels and the number of wheels depend on the existing brake circuit subdivision and may vary from vehicle to vehicle. The number of wheels per brake circuit connected to brake master cylinder 2 may vary as well. For example, it may be the case that only one wheel, in particular a wheel of the same axle, is to be connected per brake circuit.

In the following text, the method of functioning of the brake master cylinder is presumed to be known.

As already explained earlier, hydraulic unit 8 is connected to brake master cylinder 2 via at least one hydraulic line 26a, 26b, i.e., it is connected to it in hydraulic manner. Hydraulic device 8, as shown in FIG. 1, includes two brake circuits. Hydraulic line 26a branches at a point 27a. Two valves 28a and 28b are connected at branching point 27a. The valves interrupt the hydraulic lines leading to the respective connected wheel brakes. Depending on the valve design, the valves may also be utilized for controlling the inflow and/or discharge, in particular the flow rate, of brake fluid. The valves may be control valves or switching valves, for example.

In the specific embodiment shown, valves 28a and 28b are switching valves which are open when no current is flowing. Valves 28a and 28b are assigned to wheel brakes 5a and 5b.

In the same way, hydraulic unit 8 has two valves 28c and 28d, which are connected to hydraulic line 26b and to be assigned to wheel brakes 5c and 5d. Valves 28c and 28d are likewise valves which are open when no current is flowing. To trigger valves 28a, 28b, 28c and 28d, they are connected to control unit 7, especially via a data line 29 and/or via a line 29 for transmitting control signals. Line 29 is illustrated as a single line in FIG. 1, but it is also conceivable that individual lines lead to each valve.

In addition, hydraulic brake system 1 has a volume adaptation unit 3. A volume adaptation unit 3 is a unit by which the brake medium volume available in a part of the hydraulic brake system is increased and/or reduced. The part of the hydraulic brake system from which brake medium volume is removed and/or added is the hydraulic brake system minus volume adaptation unit 3. In the individual case, hydraulic supply or discharge lines in the sense of hydraulic lines must be considered, especially when they are situated between valves, discussed below, and volume adaptation unit 3. By removing and/or supplying volume from, or into, said part of the hydraulic brake system, the pressure in said part of the hydraulic brake system is adjustable.

Volume adaptation unit 3 is provided in the form of a plunger in the case at hand. One specific development of the plunger as shown in FIG. 1 includes a cylinder 30 having a disk 31, which is slidingly supported inside the cylinder. Disk 31 subdivides cylinder 30 into a first part and a second part. Brake fluid is able to be accommodated in the first part of cylinder 30 and/or discharged therefrom. A restoring spring 32 and a piston rod 33 are situated in the second part of cylinder 30. The piston rod projects into the second part of cylinder 30 and is meant to support disk 30 or to apply a force to disk 30. A transmission may be situated at the part of the piston rod that is facing away from cylinder 30. Using this transmission, a motor 34 is able to displace piston rod 33 in relation to cylinder 30. It may particularly be provided to move piston rod 33 parallel to the axis of the cylinder, especially concentrically thereto. The motor is controlled and/or regulated by control device 7.

The first part of the cylinder, especially chamber 35, accepts or discharges brake fluid. For this purpose chamber 35 is connected to at least one of lines 26a and 26b via at least one line 36a, 36b. The at least one hydraulic line 36a, 36b discharges into hydraulic line 26a, 26b, either above or below individual branching point 27a, 27b. A different discharge of lines 36a and 36b into lines 26a and 26b in relation to branching point 27a and 27b, i.e., once above and once below the branching point, is easily possible. This situation is outlined in FIG. 1.

The at least one line 36a, 36b may be interrupted by at least one valve 37a, 37b in each case. In particular, it may be provided that the at least one hydraulic line 36a, 36b is not only interrupted, but that a variable opening of valve 37a, 37b is adjustable. Using valve 37a, 37b, the inflow and/or discharge of brake fluid from plunger 3, especially from chamber 35, is regulated or adjusted. By receiving and/or discharging brake fluid from first chamber 35 or into it, the pressure in the part of the hydraulic system currently connected to chamber 35 is able to be varied/adjusted. Which part of the hydraulic brake system happens to be connected to the chamber at any particular point depends on the current position of valves 28a-d and 37a, b. It is therefore possible to select the part of the brake system currently connected to the chamber by controlling the valves with the aid of control unit 7.

Valves 37a, 37b are valves which are closed when no current is flowing. Valves 37a, 37b are switching valves or control valves, in particular. Especially the control valves are continuously adjustable control valves. Valves 37a, 37b are connected to control unit 7 via a data and/or signal line 38. Data and/or signal line 38 may be the same connection as the connection for controlling motor 34.

In at least one location of the hydraulic brake system, especially a location in at least one of brake lines 27a or 27b, a pressure sensor 39 may be provided for detecting the pressure in the particular part of the hydraulic brake system connected to the pressure sensor. The signals from the at least one pressure sensor may be utilized to control the brake system. For this purpose the pressure sensor is connected to control unit 7 by way of a data and/or signal line.

Control unit 7 of the hydraulic brake system has at least one receiving segment 209 to receive signals and/or data, and at least one output segment 210 to output signals and/or data.

Receiving segment 209 may have subsegments, among them subsegments for receiving signals and/or data from travel sensor 201 and from the at least one pressure sensor 202. In addition, signals and/or data which represent the current driving situation of the vehicle may be routed to the control device. For example, the control unit is able to receive signals and/or data 203 that signal the need for an ABS braking operation, and which in particular signal which one(s) of the wheels is/are currently locking. Also conceivable are signals that indicate the need for an active pressure buildup at at least one wheel brake, as in an electronic stability program, in automatic emergency braking or automatic column driving. Furthermore, it may be provided that control unit 7 can receive data and/or signals 204, which represent the status of a regenerative brake system of the vehicle, especially the currently acting brake torque. In addition, the control device has a data segment 211, in which specific quantities of the brake system are stored. For example, the characteristic on the basis of which controllable brake force booster 14 is triggered may be stored there. In an evaluation segment 212 of control unit 7, the data and/or signals from the input segment and/or the data segments are analyzed, at least in part, and forwarded to the output segment, or made available to the output segment, possibly via data segment 211 once again. It is then possible to output control variables, signals and/or data via output segment 210, e.g., variables 205 for the control of motor 16 of brake force booster 14, variables 206 for the control of at least one of valves 28a-d, variables 207 for the control of at least one of valves 37a,b and/or variables for the control of motor 34 of the plunger. Representing control variables 206 and 207 as an output variable does not mean that the affected valves are switched to the same position; a selective control of the valves via control unit 7, especially via output unit 210, is provided and possible.

The method for operating the hydraulic brake system according to the present invention will be described in the following text. A plurality of operating modes may be differentiated in this context. Toward this end, the specific embodiment shown in FIG. 1 will be used as starting point.

Regular braking takes place in one operating mode. All valves 28a-d of hydraulic unit 8 are without current in this operating mode, that is to say, they are open. Valves 37a and 37b are without current and thus closed. As a result, there is an open hydraulic connection from brake master cylinder 2 to wheel brakes 5a-d of wheels 6a-d. If the driver actuates the brake pedal and thus displaces input rod 9, the force is able to be determined in control unit 7 with the aid of differential travel sensor 13 and the characteristic of spring 10. The control unit determines the supplementary force of brake force booster 14 to be set and controls motor 16 accordingly. Regular braking of the vehicle takes place, during which all wheel brakes are employed. A reduction in pressure is carried out in accordance with the driver input via the pedal or via input rod 9. Plunger 3 is not operated in this context.

In one specific embodiment of a further operating mode, a braking situation exists in which at least one wheel 6a-6d is locking or exhibits a locking tendency. If such a situation is encountered, it is advantageous to reduce the brake pressure in the wheel brake of the affected wheel. In the method according to the present invention, this is done by closing all valves 28a-28d of hydraulic unit 8 in a first step. This is accomplished by energizing valves 28a-d. By closing valves 28a-d, the brake fluid is locked in the wheel brakes, in particular in wheel brake cylinders 5a-5d. The supply lines (not numbered in FIG. 1) between valve 28a-d also contain locked volume of brake fluid.

In order to now reduce the brake pressure in one of wheel brake cylinders 5a-5d of the wheels, the one valve of valves 28a-d assigned to the corresponding wheel is opened. Opening corresponding valve 37a or 37b furthermore establishes a hydraulic connection between first chamber 35 of volume adaptation unit 3 and the affected wheel.

For example, if the pressure in wheel brake cylinder 5a of wheel 6a is to be reduced, then all valves 28a-d are closed initially. In a next step, valve 28a as well as valve 37a are opened. Chamber 35 thus is connected to wheel brake cylinder 5a. Since an ABS braking operation is usually preceded by regular braking, the pressure prevailing in the brake system, especially in wheel brake cylinder 5a to stay with the example introduced earlier, is higher than in chamber 35. For this reason the brake fluid from wheel brake cylinder 5a flows back to chamber 35. This may possibly require a change in position of piston rod 33, so that disk 31 is able to be shifted. As a result, the pressure in wheel brake cylinder 5a is reduced.

Executing the described steps consecutively makes it possible to reduce the pressure in the wheel brakes individually for each wheel.

By actuating motor 34, it is also possible to shift disk 31 in such a way that the volume of brake fluid contained in chamber 35 is shifted in the direction of hydraulic lines 36a and possibly 36b. A pressure buildup is therefore also possible when a hydraulic connection to at least one of wheel brake cylinders 5a-5d is open.

Executing the described steps in consecutive manner thus makes it possible to increase the pressure in the wheel brakes individually for each wheel. Adjusting the pressure consecutively and individually for each wheel at each wheel brake cylinder 5a-5d separately is also referred to as multiplex method. In this context, it is necessary to always adjust the setpoint pressure at the wheel brake cylinder to be adjusted just then. This means that the volume of the chamber, e.g., in a consecutive pressure drop for an individual wheel, is increased in consecutive manner. In the extreme case, if a very low pressure is to be adjusted in all wheel brake cylinders, virtually the entire volume of the hydraulic brake system must be accommodated.

If valves 28a-d are implemented as switching valves, then the pressure modulation, e.g., in the case of ABS, is able to be provided by volume adaptation unit 3. This may impose a high demand on the dynamics of the volume adaptation unit. If the setpoint pressure to be set is the same in at least two wheel brake cylinders of wheels 6a-6d, then a simultaneous pressure adjustment is able to take in these wheel brake cylinders.

If valves 28a-d are implemented as regulating valves (control valves), then it is also possible, for instance, to adjust the pressure in multiple wheel brake cylinders at the same time during the pressure buildup.

Both in a pressure buildup and in a pressure drop, signals from the at least one pressure sensor 39 may be utilized for controlling motor 34 of plunger 3, and also for controlling the affected valves 37a, b and 28a-d. Pressure sensor 39 may in particular be used for specifying the length of time for which the affected valves are to be kept open, and for specifying the position disk 31 and piston rod 33 have to assume. This makes it possible to adjust a suitable target pressure at each wheel in controlled manner. If necessary, this control requires the use of a correlation with the control, which links the volume available in the brake system with the pressure resulting therefrom, e.g., a p-V characteristic, which may be stored in control unit 7. In addition, a wheel-specific p-V characteristic may be required in the individual case.

As can be gathered from the hydraulic circuit diagram in FIG. 1, in a pressure modulation, i.e., both in a pressure build-up and in the pressure build-up, there is always a hydraulic connection between plunger 3 of individual wheel brake 5a-5d to be adjusted just then, and brake master cylinder 2. In the elucidated pressure modulation, motor 16 of brake force booster 14 is kept at the same position. This may be done by a control/regulation via control device 7. If the motor is retained at this position, there will also be no change in the relative displacement of support part 12 and input rod 9. This leads to a constant compression of spring 10 and possibly of damping element 22, and consequently to a non-varying pedal force for the driver. It is assumed here that the driver keeps the actuating force and the actuating position constant. The driver therefore does not perceive any change in the actuating force to be applied and necessary in order to keep the pedal in this actuating position.

Use of the afore-described method also allows an active pressure buildup, in particular individually for each wheel. This represents another development of the further operating mode. Such an active pressure buildup may be utilized in an ESP program, in automatic emergency braking or automatic column driving. Additional situations in which an active pressure buildup may be required are conceivable. Chamber 35 has been precharged with the required volume in order to achieve the pressure to be set.

The pressure buildup is accomplished in a similar manner as described above, by appropriate setting of the individual valves and actuation of plunger 3, so that brake fluid from chamber 35 is displaced into lines 36a and/or 36b, and thus into the wheel brakes that happen to be hydraulically connected to lines 36a and/or 36b just then. This merely requires brake force booster 14 to be actuated to the extent that first and second pistons 25a,b of the brake master cylinder have already passed the openings, especially the compensation bores, in housing 23, which connect chambers 24a,b of the brake master cylinder to brake fluid reservoir 40. Otherwise no pressure buildup by actuating plunger 3 would be possible. If at all, the driver notices only a very slight displacement of the brake pedal. This dispenses with additional isolating valves in an active pressure buildup.

It is also possible to implement the active pressure buildup not with the aid of plunger 3 alone; instead, the controllable brake force booster may be operated for an active pressure buildup as well, either jointly with plunger 3 or also by itself.

Using the described pressure modulation method, especially the wheel-specific pressure modulation, with the aid of plunger 3, makes the hydraulic brake system suitable for operating as part of a brake system which in addition to the hydraulic brake system, includes at least one further brake system, especially a regenerative brake system. In such a regenerative brake system, a generator, which operates a consumer in the vehicle, in particular charges an energy store, may be connected to an axle of the vehicle. Operating the generator also has a decelerating effect on the vehicle. The regenerative braking effect is heavily speed-dependent and varies in the course of braking. In addition, the regenerative braking effect is partially activated or deactivated as a function of the driving situation. In order to suitably combine such a varying regenerative braking effect with the braking effect of the hydraulic brake system, to the effect that an overall braking effect is formed for the vehicle, the hydraulic braking effect must be adapted. In this context it may be provided to adjust the braking effect at the vehicle axle only in the brakes assigned to the particular axle at which the regenerative braking effect is applied as well. However, it is also possible to adjust all hydraulically actuated wheel brake cylinders.

Using the afore-described method, the pressure is able to be modulated individually for each wheel, and thus also individually for each axle.

If the regenerative braking effect decreases, pressure is able to be built up in the desired wheel brake cylinders, and if the regenerate braking effect increases, the pressure may be lowered. In the process, motor 16 of brake force booster 14 may again be controlled in in such a way that it retains its position. The driver therefore does not notice any pressure change in the hydraulic brake system, despite the fact that a pressure change has indeed taken place because of the actuation of plunger 3. Regenerative braking, in particular at a variable component of the regenerative brake, is therefore possible without the driver becoming aware of it.

As an alternative to the afore-described development, in a first additional embodiment it is possible to replace the two lines 36a and 36b leading from the plunger, especially from chamber 35, to the brake circuits and to lines 26a and 26b, respectively, with only a single hydraulic line. The afore-described method for modulating the brake pressure at at least one wheel, for an active pressure buildup and/or for recuperation purposes must then be modified. For instance, if only line 36a having valve 37a is provided in this embodiment, then the pressure in wheel brakes 5a and 5b may be modulated in a manner similar to the already described method. A pressure modulation in wheel brakes 5c and/or 5d must be implemented in some other manner. Since line 36b is missing, the pressure modulation has to take place via the brake master cylinder 2. For instance, if brake fluid volume is received in chamber 35 when valves 28a and 28b are closed, then this may lead to a volume removal from second chamber 24a of brake master cylinder 2. Due to the pressure differential, the brake fluid flows from chamber 24a into chamber 35. This causes a corresponding displacement of the second piston of the master brake cylinder, toward the left in FIG. 1, which means that brake fluid is able to drain, via a correspondingly opened hydraulic connection to connected wheel brakes 5c and 5d, from there into first chamber 24b.

Brake master cylinder 2 must be developed as a floating piston in such a case.

In analogous manner to this method, a pressure buildup may take place at wheel brake cylinders 5c and 5d. It is therefore possible to modulate the pressure via the master brake cylinder also in the wheel brakes that are not connected to line 36a. However, in comparison with the afore-described method, this method may have a hysteresis and/or friction losses in the pressure modulation.

In a second, further development of the hydraulic brake system, valves 37a and 37b in lines 36a and 36b do not exist. To implement a pressure modulation at at least one wheel brake 5a-d, a plunger 3 having a self-inhibiting transmission is provided on motor 34. If no contribution by the plunger is desired in a braking operation, i.e., no pressure modulation, then plunger 3 will simply not be operated. Because of the self-inhibiting transmission, the hydraulic connection, e.g., of line 26a to chamber 35, may stay in place nevertheless, without any effect on the pressure in the brake system.

The afore-described additional embodiments of the hydraulic brake system having a self-inhibiting plunger and/or only one line 36a or 36b from chamber 35 as connection to the wheel brakes may just as well be used for an active pressure buildup in ACC or ESP situations, for instance. In the same way, the two further embodiments may also be used to represent a pressure modulation, especially an ABS functionality. In this case the individual wheel brakes are likewise controlled using the multiplex method. Regenerative braking is possible also in the two further embodiments, analogously to the afore-described procedure.

What is claimed is:

1. A hydraulic brake system for a vehicle having multiple wheel brake cylinders corresponding to multiple wheels, comprising:
   a brake master cylinder in hydraulic connection with at least one wheel brake cylinder of the multiple wheel brake cylinders of at least one wheel of the multiple wheels;
   a plunger in hydraulic connection with the at least one wheel brake cylinder and the brake master cylinder; and
   a brake force booster for actuating the brake master cylinder, wherein the brake force booster has an input element, wherein, during a pressure adjustment in the at least one wheel brake cylinder by an operation of the plunger, an actuating position of the input element is maintained by an operation of the brake force booster and a non-varying force applied by a driver and capable of causing a displacement of the input element, wherein the hydraulic connection among the at least one wheel brake cylinder, the plunger and the brake master cylinder is continuously maintained during the pressure adjustment at the at least one wheel brake cylinder;
   wherein the pressure adjustment in the at least one wheel brake cylinder takes place by operating the plunger and the brake force booster when at least one hydraulic connection has been established among the at least one wheel brake cylinder, the plunger and the brake master cylinder, and wherein during the pressure adjustment in the at least one wheel brake cylinder, the hydraulic connection between the remaining wheel brake cylinders of the multiple wheel brake cylinders located between the at least one wheel brake cylinder, the plunger and the brake master cylinder is interrupted.

2. The hydraulic brake system as recited in claim 1, wherein the retention of the actuating state of the input element corresponding to a retention of the force to be applied in order to keep the input element at a particular position, and wherein the brake force booster is controlled in such a way that (i) the non-varying force to be applied by the driver in order to keep the input element at a particular position is independent of the pressure prevailing in the brake system, and (ii) an actuating position of the brake force booster is maintained.

3. The hydraulic brake system as recited in claim 1, wherein the establishment of the at least one hydraulic connection among the at least one wheel brake cylinder, the plunger and the brake master cylinder takes place by at least one interruption element of a first type and at least one interruption element of a second type.

4. The hydraulic brake system as recited in claim 3, wherein the at least one wheel brake cylinder is hydraulically connected to the brake master cylinder via precisely one interruption element of the second type.

5. The hydraulic brake system as recited in claim 3, wherein the interruption element of the first type is one of (i) a switching valve which is closed in the deenergized state, or (ii) a control valve which is closed in the deenergized state.

6. The hydraulic brake system as recited in claim 3, wherein the interruption element of the second type is one of (i) a switching valve which is open in the deenergized state, or (ii) a control valve which is open in the deenergized state.

7. The hydraulic brake system as recited in claim 1, wherein the pressure adjustment in the at least one wheel brake cylinder takes place by operating the plunger via at least one of (i) a direct hydraulic connection of the plunger to the at least one wheel brake cylinder and (ii) an indirect hydraulic connection via the brake master cylinder.

8. The hydraulic brake system as recited in claim 1, wherein the non-varying force is applied by the driver to a pedal, wherein the pedal and the input element are distinct.

9. A method for operating a hydraulic brake system for a vehicle having multiple wheel brake cylinders corresponding to multiple wheels, comprising:
   providing a brake master cylinder in hydraulic connection with at least one wheel brake cylinder of the multiple wheel brake cylinders of at least one wheel of the multiple wheels;
   providing a plunger in hydraulic connection with the at least one wheel brake and the brake master cylinder; and
   actuating the brake master cylinder using a brake force booster having an input element, wherein in a first operating mode, during a pressure adjustment in the at least one wheel brake cylinder by an operation of the plunger, an actuating position of the input element is maintained by an operation of the brake force booster and a non-varying force applied by a driver and capable of causing a displacement of the input element, wherein the hydraulic connection among the at least one wheel brake cylinder, the plunger and the brake master cylinder is continuously maintained during the pressure adjustment at the at least one wheel brake cylinder;

wherein the pressure adjustment in the at least one wheel brake cylinder takes place by operating the plunger and the brake force booster when at least one hydraulic connection has been established among the at least one wheel brake cylinder, the plunger and the brake master cylinder, and wherein during the pressure adjustment in the at least one wheel brake cylinder, the hydraulic connection between the remaining wheel brake cylinders of the multiple wheel brake cylinders located between the at least one wheel brake cylinder, the plunger and the brake master cylinder is interrupted.

10. The method as recited in claim 9, wherein the pressure in the at least one wheel brake cylinder is adjusted in temporal sequence with at least one of the other wheel brake cylinders.

11. The method as recited in claim 9, wherein in a second operating mode, the pressure is adjusted solely by actuating the brake force booster.

12. The method as recited in claim 9, wherein the pressure adjustment at the at least one wheel brake cylinder takes place during an active pressure buildup and is independent of the driver.

13. The method as recited in claim 12, wherein in an active pressure buildup, the brake force booster is operated in such a way that an exchange of brake medium between the brake master cylinder and a brake medium reservoir assigned to the brake master cylinder is prevented.

14. The method as recited in claim 9, wherein the pressure adjustment at the at least one wheel brake cylinder takes place during a pressure modulation in order to prevent locking of the at least one wheel assigned to the at least one wheel brake cylinder.

15. The method as recited in claim 9, wherein the hydraulic brake system is part of an overall brake system having an additional regenerative brake system in addition to the hydraulic brake system, and wherein the pressure adjustment at the at least one wheel brake cylinder takes place within the framework of an adaptation of a hydraulic braking effect to a braking effect of the regenerative brake torque.

16. The method as recited in claim 15, wherein an overall braking effect, which includes the hydraulic braking effect and the regenerative braking effect, is kept constant by adapting the hydraulic braking effect.

17. The method as recited in claim 9, wherein the non-varying force is applied by the driver to a pedal, wherein the pedal and the input element are distinct.

18. A control device for controlling operation of a hydraulic brake system for a vehicle having multiple wheel brake cylinders corresponding to multiple wheels, wherein the control device is configured to:

provide a brake master cylinder in hydraulic connection with at least one wheel brake cylinder of the multiple wheel brake cylinders of at least one wheel of the multiple wheels;

provide a plunger in hydraulic connection with the at least one wheel brake and the brake master cylinder; and actuate the brake master cylinder using a brake force booster having an input element, wherein in a first operating mode, during a pressure adjustment in the at least one wheel brake cylinder by an operation of the plunger, an actuating position of the input element is maintained by an operation of the brake force booster and a non-varying force applied by a driver and capable of causing a displacement of the input element, wherein the hydraulic connection among the at least one wheel brake cylinder, the plunger and the brake master cylinder is continuously maintained during the pressure adjustment at the at least one wheel brake cylinder;

wherein the pressure adjustment in the at least one wheel brake cylinder takes place by operating the plunger and the brake force booster when at least one hydraulic connection has been established among the at least one wheel brake cylinder, the plunger and the brake master cylinder, and wherein during the pressure adjustment in the at least one wheel brake cylinder, the hydraulic connection between the remaining wheel brake cylinders of the multiple wheel brake cylinders located between the at least one wheel brake cylinder, the plunger and the brake master cylinder is interrupted.

19. The control device as recited in claim 18, wherein the control unit is configured to implement the control of the operation of the hydraulic brake system by:

(i) considering as input variables at least one of a signal of a travel sensor, a signal of a pressure sensor, a signal with regard to a request for a pressure adaptation, a signal with regard to a request for an active pressure buildup, a signal with regard to an existing driving situation, a signal with regard to an operating state of a regenerative brake system; and (ii) outputting a control variable for at least one of a control of a motor of the brake force booster, a control of at least one valve, and a control of a motor of the plunger.

* * * * *